US010660101B2

(12) United States Patent
Nammi et al.

(10) Patent No.: US 10,660,101 B2
(45) Date of Patent: May 19, 2020

(54) IDENTIFYING A BEAM IN 5G WIRELESS COMMUNICATION SYSTEMS

(71) Applicant: AT&T INTELLECTUAL PROPERTY I, L.P., Atlanta, GA (US)

(72) Inventors: SaiRamesh Nammi, Austin, TX (US); Salam Akoum, Austin, TX (US); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/910,912

(22) Filed: Mar. 2, 2018

(65) Prior Publication Data

US 2019/0274127 A1 Sep. 5, 2019

(51) Int. Cl.
*H04W 72/04* (2009.01)
*H04B 7/06* (2006.01)
*H04W 4/02* (2018.01)
*H04B 17/318* (2015.01)
*H04B 7/08* (2006.01)

(52) U.S. Cl.
CPC ........ *H04W 72/046* (2013.01); *H04B 7/0617* (2013.01); *H04B 7/0695* (2013.01); *H04B 7/088* (2013.01); *H04B 17/318* (2015.01); *H04W 4/02* (2013.01)

(58) Field of Classification Search
CPC .... H04W 72/046; H04W 4/02; H04B 17/318; H04B 7/0617
See application file for complete search history.

(56) References Cited

U.S. PATENT DOCUMENTS

| 9,743,348 | B2 | 8/2017 | Kakishima et al. |
| 9,750,003 | B2 | 8/2017 | Yu et al. |
| 9,867,192 | B2 | 1/2018 | Krzymien et al. |
| 9,900,891 | B1 | 2/2018 | Islam et al. |
| 2003/0231606 | A1* | 12/2003 | Wu ............... H04B 7/0634 370/334 |
| 2016/0127919 | A1* | 5/2016 | Hui ............... H04W 16/28 342/371 |

(Continued)

OTHER PUBLICATIONS

International Search Report and Written Opinion received for PCT Application Serial No. PCT/US2019/020152 dated May 22, 2019, 15 pages.

(Continued)

*Primary Examiner* — Zhensheng Zhang
(74) *Attorney, Agent, or Firm* — Amin, Turocy & Watson, LLP

(57) ABSTRACT

Various embodiments disclosed herein provide for optimizing identification of a beam in a massive multiple-input multiple output (MIMO) system. The receiver device can select a beam to use for a transmission, and generate channel state information based on a selection of either a single stage beam selection process or a two stage beam selection process. According to an embodiment of the disclosure, the receiver can select which beam selection process to use based on the context of the receiver device. The receiver can select which beam selection process to use based on the long term signal to noise ratio, or the correlation metrics associated with the receiver and transmitter, or based on the path loss between the transmitter and receiver, or based on the location of the receiver relative to the transmitter.

20 Claims, 10 Drawing Sheets

(56) References Cited

U.S. PATENT DOCUMENTS

| | | |
|---|---|---|
| 2016/0134352 A1 | 5/2016 | Stirling-Gallacher |
| 2016/0337056 A1* | 11/2016 | Frenne ................ H04B 7/0695 |
| 2017/0078004 A1 | 3/2017 | Capar et al. |
| 2017/0134964 A1 | 5/2017 | Yu et al. |
| 2017/0164377 A1 | 6/2017 | Ho et al. |
| 2017/0324459 A1 | 11/2017 | Koskela et al. |
| 2018/0006696 A1 | 1/2018 | Yue et al. |
| 2018/0048442 A1 | 2/2018 | Sang et al. |

OTHER PUBLICATIONS

Sony, "Discussion on Beam Training Procedure of NR MIMO", URL : http://www.3gpp.org/ftp/Meetings 3GPPSYNC/RAN1/Docs/, 3GPP TSG-RAN WG1 #86bis Lisbon, Portugal Oct. 10-14, 2016, R1-1609379, Oct. 9, 2016, 5 pages.

Sony, "Remaining Aspects of Beam Management for NR MIMO", URL : http://www.3gpp.org/ftp/Meetings 3GPPSYNC/RAN1/Docs/, 3GPP TSG-RAN WG1 #88 Athens, Greece, Feb. 13rd.1 ih, 2017, R1-1703132, Feb. 12, 2017, 5 pages.

\* cited by examiner

IDENTIFYING A BEAM IN 5G WIRELESS COMMUNICATION SYSTEMS

TECHNICAL FIELD

The present application relates generally to the field of mobile communication and, more specifically, to creating selecting a beam selection technique in a next generation wireless communications network.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G and other next generation network standards.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
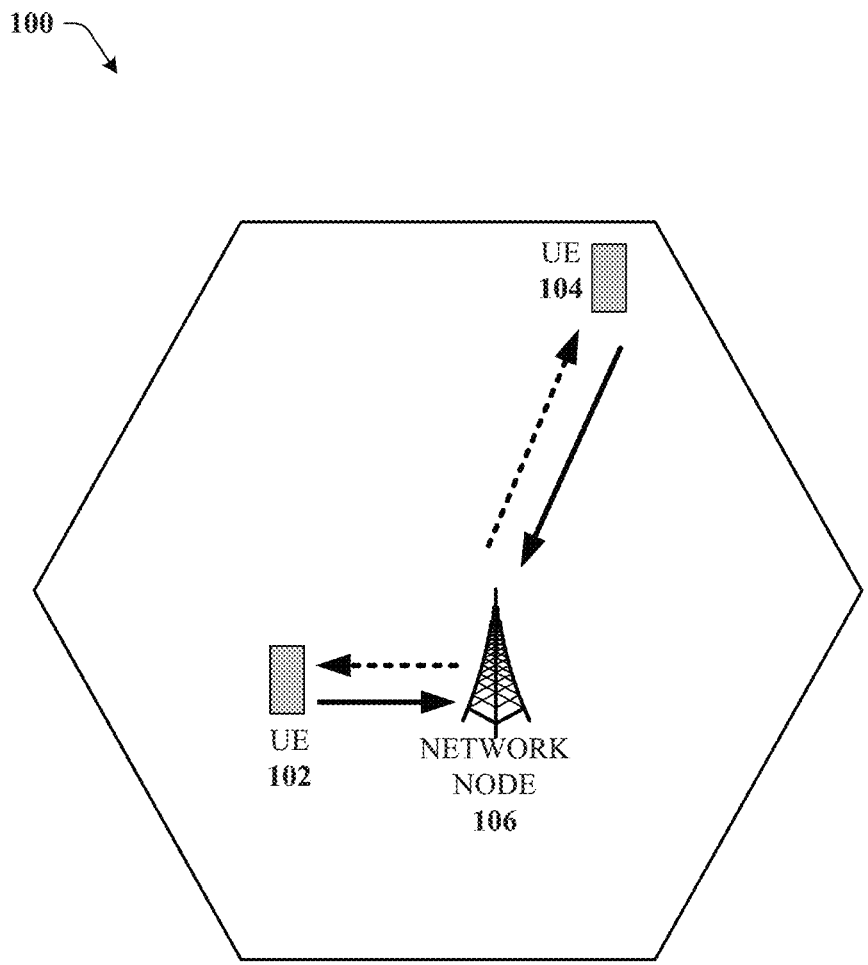
FIG. 1 illustrates an example wireless communication system in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

Various embodiments disclosed herein provide for optimizing identification of a best beam in a massive multiple-input multiple output (MIMO) system. A single stage beam selection process, which computationally identifies the optimal beam by computing various parameters, can select the beam with the highest throughput, especially when the signal to noise ratio of the communication link between the transmitter and receiver. A two stage beam selection process is faster, and requires less computation than the single stage beam selection process, but has lower spectral efficiency at higher signal to noise ratios. According to an embodiment of the disclosure, the receiver can select which beam selection process to use based on the context of the receiver device. The receiver can select which beam selection process to use based on the long term signal to noise ratio, or the correlation metrics associated with the receiver and transmitter, or based on the path loss between the transmitter and receiver, or based on the location of the receiver relative to the transmitter.

In various embodiments, a user equipment device can comprise a processor and a memory that stores executable instructions that, when executed by the processor facilitate performance of operations. The operations can comprise determining a signal strength of a reference signal over a determined period of time received from a base station device. The operations can also comprise in response to the signal strength being below a defined threshold, selecting a beam according to a single stage beam selection protocol and in response to the signal strength being above the defined threshold, selecting the beam according to a two stage beam selection protocol. The operations can also comprise transmitting channel state information associated with the beam to the base station device via an uplink control channel.

In another embodiment, method comprises receiving, by a receiver device comprising a processor, a reference signal from a transmitter device. The method can also comprise determining, by the receiver device, a signal strength of the reference signal. The method can also comprise selecting, by the receiver device, a beam selection technique based on the signal strength of the reference signal, wherein a single stage selection technique is selected in response to the signal strength being below a defined signal strength, and a two stage selection technique is selected in response to the signal strength being above the defined signal strength. The method can also comprise, based on the beam selection technique selected, selecting, by the receiver device, a beam and determining channel state information for the beam.

In another embodiment machine-readable storage medium, comprising executable instructions that, when executed by a processor of a device, facilitate performance of operations. The operations can comprise receiving an indication from a user equipment device about a signal strength of a reference signal received by the user equipment device from a base station device. The operations can also comprise in response to the signal strength being below a defined threshold, selecting a two stage beam selection protocol, and in response to the signal strength being above the defined threshold, selecting the beam according to a single stage beam selection protocol. The operations can also comprise transmitting an indication of a selected beam selection protocol to the user equipment device.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

FIG. 1 illustrates an example wireless communication system 100 in accordance with various aspects and embodiments of the subject disclosure. In one or more embodiments, system 100 can comprise one or more user equipment UEs 104 and 102, which can have one or more antenna panels having vertical and horizontal elements. A UE 102 can be a mobile device such as a cellular phone, a smartphone, a tablet computer, a wearable device, a virtual reality (VR) device, a heads-up display (HUD) device, a smart car, a machine-type communication (MTC) device, and the like. UE 102 can also refer to any type of wireless device that communicates with a radio network node in a cellular or mobile communication system. Examples of UE 102 are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. User equipment UE 102 can also comprise IOT devices that communicate wirelessly. In various embodiments, system 100 is or comprises a wireless communication network serviced by one or more wireless communication network providers. In example embodiments, a UE 102 can be communicatively coupled to the wireless communication network via a network node 106.

The non-limiting term network node (or radio network node) is used herein to refer to any type of network node serving a UE 102 and UE 104 and/or connected to other network node, network element, or another network node from which the UE 102 or 104 can receive a radio signal. Network nodes can also have multiple antennas for performing various transmission operations (e.g., MIMO operations). A network node can have a cabinet and other protected enclosures, an antenna mast, and actual antennas. Network nodes can serve several cells, also called sectors, depending on the configuration and type of antenna. Examples of network nodes (e.g., network node 106) can comprise but are not limited to: NodeB devices, base station (BS) devices, access point (AP) devices, and radio access network (RAN) devices. The network node 106 can also comprise multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like. In 5G terminology, the node 106 can be referred to as a gNodeB device.

Wireless communication system 100 can employ various cellular technologies and modulation schemes to facilitate wireless radio communications between devices (e.g., the UE 102 and 104 and the network node 106). For example, system 100 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), OFDM, (DFT)-spread OFDM or SC-FDMA)), FBMC, ZT DFT-s-OFDM, GFDM, UFMC, UW DFT-Spread-OFDM, UW-OFDM, CP-OFDM, resource-block-filtered OFDM, and UFMC. However, various features and functionalities of system 100 are particularly described wherein the devices (e.g., the UEs 102 and 104 and the network device 106) of system 100 are configured to communicate wireless signals using one or more multi carrier modulation schemes, wherein data symbols can be transmitted simultaneously over multiple frequency subcarriers (e.g., OFDM, CP-OFMD, DFT-spread OFMD, UFMC, FMBC, etc.).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs).

In an embodiment, UE 102 or 104 can receive a reference signals from network node 106. The reference signals can be used to identify beams and the UE 102 and 104 can measure the signal strengths of the reference signals to facilitate beam selection and management. Beam management is a procedure that can be used to acquire and maintain a set of transmit/receive points and/or UE beams that can be used for downlink and uplink transmission/reception, which includes beam determination, measurement, and reporting. Beam management includes beam measurement, beam reporting, and beam selection.

In a BS with hybrid beamforming (also known as hybrid precoding/preprocessing), an analog RF beamforming matrix, built from analog hardware like phase-shifters, is used to connect N antenna elements to K up/down-conversion chains, where K<N. This beamforming matrix exploits channel state information to form beams into the dominant angular directions of each user's channel, thereby, utilizing the transmit power more effectively and providing some multiuser separation with fewer up/down-conversion chains. Since the analog hardware components are relatively cheap and consume less power than the up/down-converters and mixed signal components, this design leads to significant savings as compared to a full complexity transceiver, e.g., with N up/down-conversion chains.

In hybrid forming, consider a case where the number of antenna elements is equal to N. However, also consider a case where the network uses Np ports (Np=2 or 4 or 8 or 16). In this case, the signals transmitted from N elements can be virtualized from the Np antenna ports. Hence the received signals for the $i^{th}$ subcarrier can be written as:

$$Y=HFWx+n \qquad \text{Equation 1:}$$

Where H is the channel matrix between the transmitter antenna elements dimensions ($N_r \times N$), F is the analog beamforming matrix of dimensions ($N \times N_p$), W is the digital precoding matrix of dimensions ($N_p \times R$) and x is the transmitted signal vector of size (R x1), and R is the transmission rank of the system.

For the Hybrid beamforming to work using massive MIMO, the network needs to identify the best beamforming matrices/vectors F and W for a particular UE. One approach for identifying the best beamfoming matrices/vectors is to obtain the feedback from the UE by transmitting the beamformed reference signal. For example, say the network uses K beams with N antenna elements in an Np antenna port system. Hence the UE needs to search these K beams and communicates to the network the best beam index. Note that this method is similar to identifying the best precoding matrix in all digital system, e.g., identify the beamforming matrix F, digital beamforming matrix W, transmission rank R, which can give the best capacity. However, the computational complexity with this approach is very high when K is large. This is because the UE needs to identify capacity for each beam index by computing the capacity for all the ranks within a beam.

Selecting the best beam can lead to optimized throughput as some beams are more capable than other beams with transmitting data quickly and efficiently. For identifying the best beams and the corresponding channel state information parameters, two approaches can be used. In the first approach, the receiver chooses the best beam on Reference Signal Received Power (RSRP) and in the second approach the receiver chooses the best beam based on RSRP or after the detector. The first approach, called the two stage approach, the receiver computes the received power from the beam formed reference signals and chooses the best beam based on the maximum received power. In the second stage, the receiver (e.g., device 102 or 104) will choose the channel state information parameters (Rank Indicator "RI", Channel Quality Indicator "CQI", and Precoding Matrix Indicator "PMI") in the chosen beam. As an example, the first stage $$\max_{\text{beam index}} \text{Received Power(Beam Index)} \quad \text{Equation 2}$$

is selected, and then In the second stage it will choose:

$$\max_{CQI,PMI,RI} \text{Throughput}(CQI, PMI, RI) \text{ subject to } BLER \leq \quad \text{Equation 3}$$
$$\text{Threshold, beam index}$$

where BLER is the block error rate that is a ratio of the number of erroneous blocks to the total number of blocks sent. During the first stage, the beam with the highest power is selected, as a way of narrowing the search field, and then in the second stage, the channel state information that provides the largest throughput for the selected beam is determined, subject to the constraint that the block error rate is below a predetermined threshold.

In the single stage selection process, the receiver chooses the best beam and the CSI all in one stage (e.g., the receiver chooses the best beam and CSI that gives the highest throughput with first narrowing the search field by selecting the beam with the highest RSRP.

$$\max_{CQI,PMI,RI,\text{beam index}} \text{Throughput}(CQI, PMI, RI, \text{beam index}) \quad \text{Equation 4}$$
$$\text{subject to } BLER \leq \text{Threshold}$$

Another variant of this technique is the best beam is indicated using channel resource indicator (CRI), e.g., the network sends multiple CSI-RS and the UE computes the metric as above and sends the CRI, CQI, PMI, and RI. In some cases, the network requests only CRI and avoids CSI.

Another variant of this selection algorithm is that the selection at the receiver can be network assisted. The network chooses whether the receiver should choose the two-stage or the single stage approach using downlink control channel indication. The receiver can then provide feedback either CRI only, or CSI, depending on the chosen selection algorithm.

In an embodiment, the two stage selection process is faster, and consumes less computing resources than the single stage selection process due to the narrowed search field, but provides lower spectral efficiency at higher signal strengths or higher signal to noise ratios, where the single stage selection process performs with higher spectral efficiency. Therefore, in an embodiment, the receiver can select the two stage selection process at lower signal to noise ratios, and select the single stage selection process at higher signal to noise ratios. In an embodiment, there can be a predetermined signal to noise ratio (SNR) or signal plus interference to noise ratio (SINR), above which the single stage selection process is performed, and below which the two stage selection process is performed.

In another embodiment, the receiver 102 or 104 can use location as a proxy for signal to noise ratio, and determine the location of the receiver relative to the network node 106. If the receiver is further away (e.g., UE 104) the UE can select the two stage selection process since the SNR or SINR can be presumed to be lower, whereas UE 102 may select the single stage beam selection as it is closer to the network node 106. In another embodiment, the UE 104 and 102 can measure path loss and use that as a proxy for SNR or SINR. In another embodiment, the receiver node 102 or 104 can compute the path loss and decides to choose which beam selection algorithm to use. As path loss in inversely proportional to the long term SNR, in this case, the receiver chooses the beam selection based on two stage selection process when the path loss is very large and choose the beam selection based on single stage approach when the path loss is very small.

Figure 2:
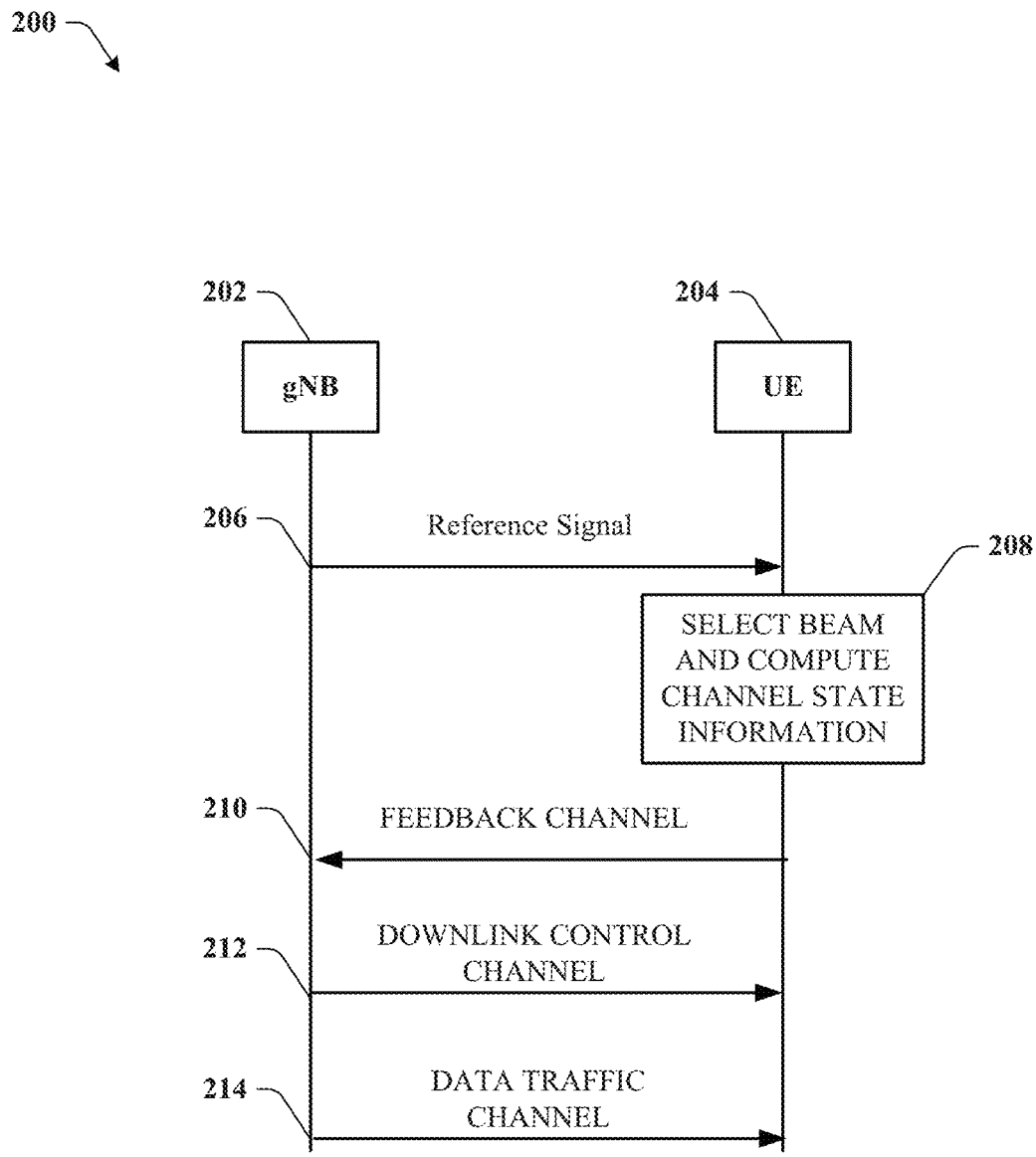
FIG. 2 illustrates an example block diagram showing a message sequence chart in accordance with various aspects and embodiments of the subject disclosure.

Turning now to FIG. 2, illustrated is an example block diagram showing a message sequence chart 200 in accordance with various aspects and embodiments of the subject disclosure.

In an embodiment, a gNodeB (or other network node) 202 can issue a reference signal 206 that can be received by a UE 204. The reference signal can be beamformed in some embodiments, or non beamformed in other embodiments. In an embodiment, the reference signal can be a CSI-RS signal that is UE specific, or is addressed to one or more UEs (e.g., UE 204).

At 208, the UE 204 can determine which beam selection process to use, either single stage or two stage based on variety of contextual information, including SNR, SINR, location of the UE 204 relative to the gNB 202, path loss, a network indication, or a correlation metric associated with the communication link between 202 and 204. Once the beam selection process has been selected, the UE 204 can select the optimal beam and determine channel state information, and then provide the channel state information back to the gNB 202 on the feedback channel 210. Based on the CSI, the gNB 202 can provide downlink control information on downlink control channel 212 and schedule the data traffic channel 214.

Figure 3:
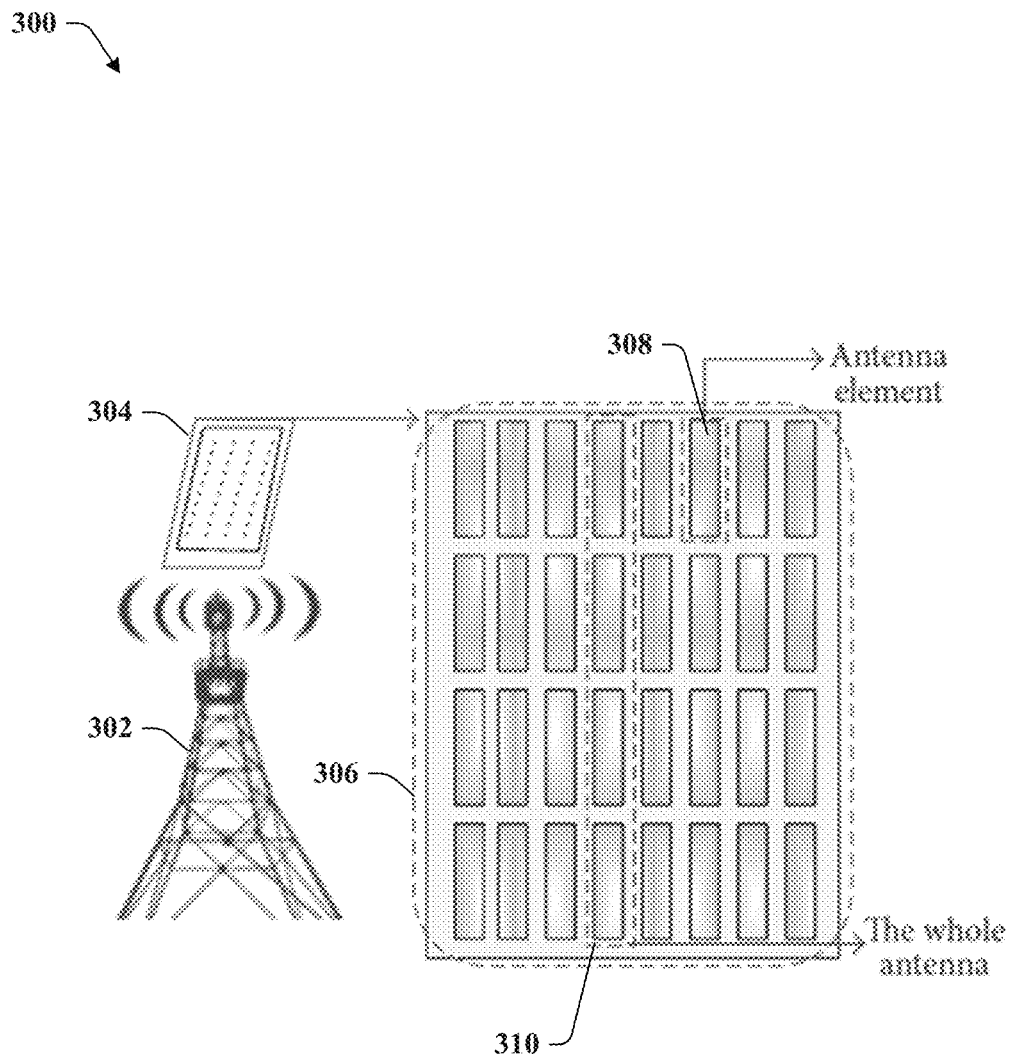
FIG. 3 illustrates an example embodiment of an antenna array for hybrid beamforming in accordance with various aspects and embodiments of the subject disclosure.

Turning now to FIG. 3, illustrated is an example embodiment of an antenna array 300 for hybrid beamforming in accordance with various aspects and embodiments of the subject disclosure. In an embodiment, the transmitter 302 can select which antenna element (e.g., antenna element 308) or group of antenna elements (e.g., group 310) from among the set of antenna elements 306 of the antenna 304 to use for a transmission. Each group, sub group, etc., can be associated with one or more beams, and the beams that provide the highest throughput can be selected for transmission to the receiver. The receiver can select the beam selection process based on SNR, SINR, correlation, location, and other metrics, and then select the optimal beam and determine CSI information for the beam.

In another embodiment, the transmitter 302 can select the beam selection process and communicate the selection indication to the receiver. The receiver can then take the indication into consideration when selecting the beam selection process and selecting the beam and determining the channel state information.

For example, the transmitter 302 can be deployed with 32/64/128/256 antenna elements. Note that when massive MIMO is deployed at the network side, ideally, each RF component is equal to that of antenna element for achieving beamforming/multiplexing gains. However, the cost for deploying RF circuitry for each antenna element can be reduced by using the concept of Hybrid beamforming. An example of hybrid beamforming using active antenna arrays. In hybrid forming, for example, say the number of antenna elements is equal to N. However, say the network uses Np ports (Np=2 or 4 or 8 or 16). In this case, the signals transmitted from N elements can be virtualized from the Np antenna ports. Hence, the received signals for the $i^{th}$ subcarrier can be written as Y=HFWx+n Where H is the channel matrix between the transmitter antenna elements dimensions ($N_r \times N$), F is the analog beamforming matrix of dimensions ($N \times N_p$), W is the digital precoding matrix of dimensions ($N_p \times R$) and x is the transmitted signal vector of size (R x1), and R is the transmission rank of the system.

Figure 4:
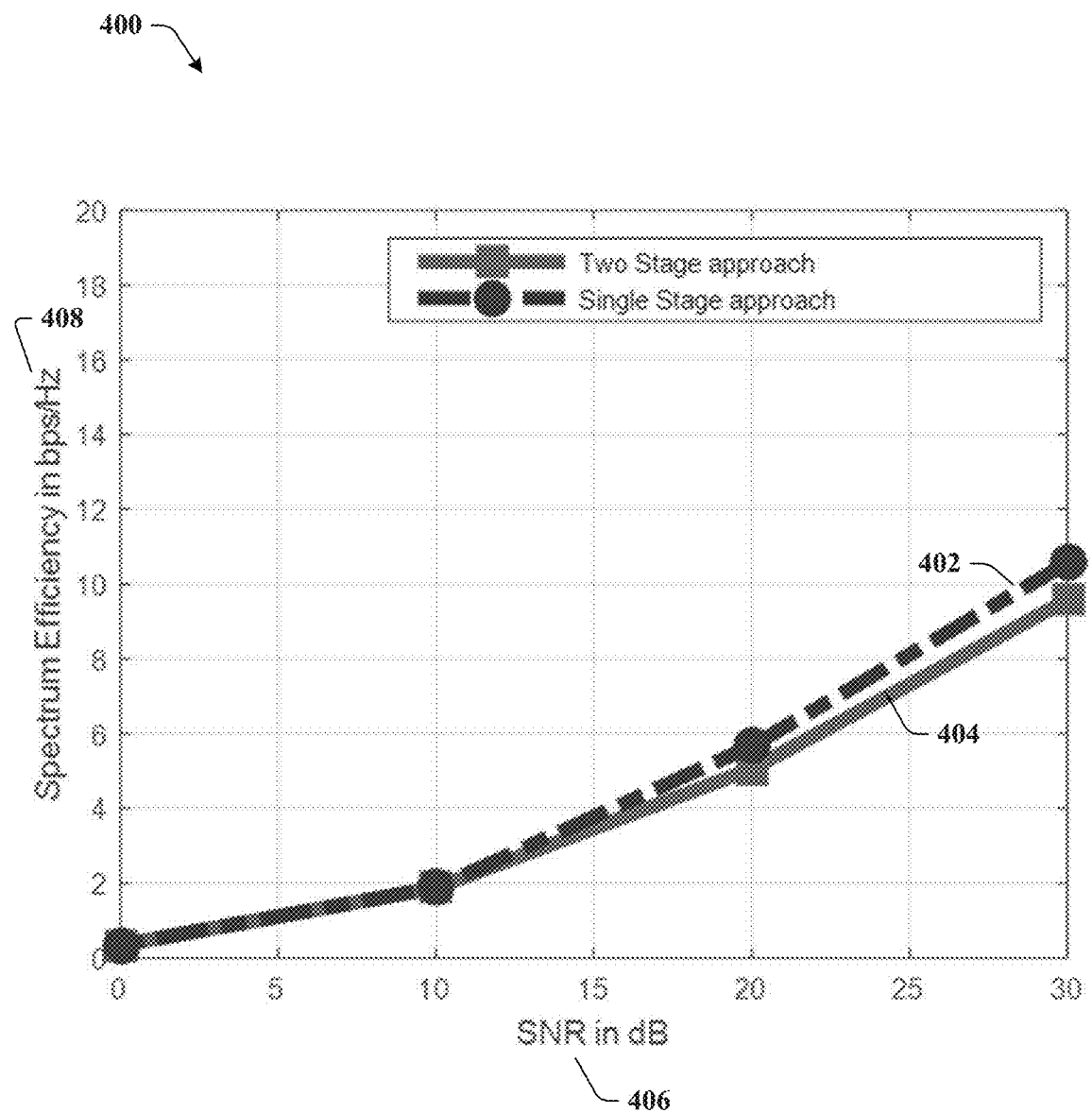
FIG. 4 illustrates an example graph showing spectral efficiency of two different beam selection techniques in accordance with various aspects and embodiments of the subject disclosure.

Turning now to FIG. 4, illustrated is an example graph 400 showing spectral efficiency of two different beam selection techniques in accordance with various aspects and embodiments of the subject disclosure. As can be seen, at lower SNR values 406, the spectral efficiency in bps/Hz 408 is roughly the same for the two stage approach 404 and the single stage approach 402. But at higher SNR values, the single stage approach 402 has improved spectral efficiency values than the two stage approach 404. Therefore, for a given predetermined SNR value, the receiver can determine to use the single stage approach for SNRs above the predetermined value, and the two stage approach for SNRs below the predetermined value.

At low SNR, the performance between the two algorithms is the same or similar. Hence if the UE computes the long term SNR, and checks if it is less than a pre-defined threshold, then it will choose beam selection based on RSRP (Two stage approach) there by reducing the number of computations required for beam selection. In our example, it is around 10 dB. In one embodiment, the UE can periodically compute the long term SNR, and decide whether to choose beam selection based on the RSRP or joint selection of Beam index, RI, PMI and CQI (single stage approach)

Figure 5:
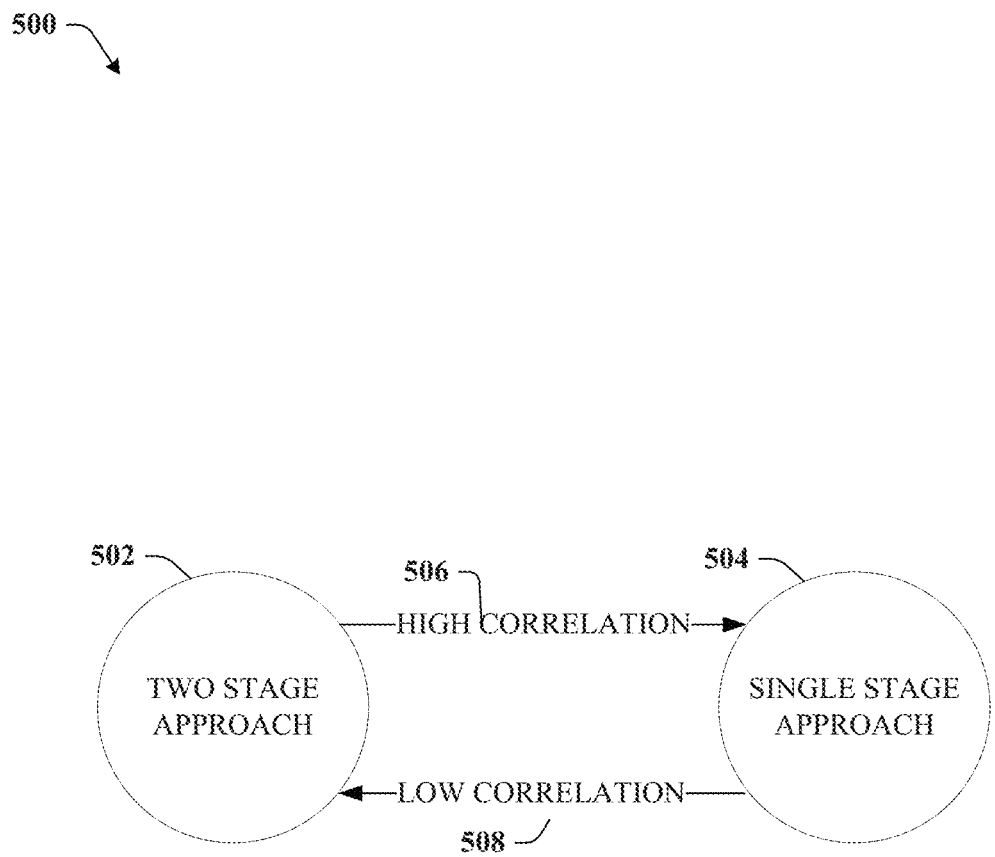
FIG. 5 illustrates an example block diagram showing how correlation relates to beam selection technique in accordance with various aspects and embodiments of the subject disclosure.

Turning now to FIG. 5, illustrated is an example block diagram 500 showing how correlation relates to beam selection technique in accordance with various aspects and embodiments of the subject disclosure. If there is a high correlation 506, indicating that the communication link is similar to another link, the receiver can select the single stage approach 504. On the other hand, if there is low correlation 508, the UE can choose the two stage approach 502.

In an embodiment, the UE can estimate the channel from the reference signals and determines the correlation metric between the transmitter and the receiver. Once it determines the correlation metric, it will choose the beam selection algorithm based on RSRP if the correlation is very low or less than a threshold, e.g., almost independent channel. If the correlation metric is higher than a threshold, it will choose the beam selection based on single stage approach.

In an embodiment, the correlation matrix can be computed from the estimated channel Note that the invention is equally applicable with any other technique of computing the correlation matrix. Let $H_i$ be the computed channel matrix for the $i^{th}$ OFDM subcarrier. Let $N_c$ denotes the total number of carriers in the MIMO-OFDM system. Then in one embodiment the correlation matrix is computed as $$R_H = \frac{1}{Nc} \sum_{i=1}^{Nc} Vec(Hi)Vec(Hi)^H \qquad \text{Equation 5}$$

Where vec(Hi) as the column vector by stacking up all the columns of Hi. For example, if Hi=[2 3;4 5] is the channel matrix, then vec(Hi) is given by $[2\ 3\ 4\ 5]^T$ where $[X]^T$ is the transpose of X. Also, $[X]^H$ is the Hermitian operation the vector X. In another embodiment, the correlation matrix can be computed based on M realizations as means:

$$R_H = \frac{1}{MNc} \sum_{J=1}^{M} \sum_{i=1}^{Nc} Vec(Hi)Vec(Hi)^H \qquad \text{Equation 6}$$

M can represent time intervals, and could also represent different pilots over one of several resource blocks, over which the correlation is averaged. In another embodiment, the correlation is not performed on full stacked column vectors vec(Hi), but instead the channel matrix H. This will limit complexity, and not capture all cross-terms in the correlation but be able to detect important properties of channel correlation.

$$R_H = \frac{1}{Nc} \sum_{i=1}^{Nc} Hi \cdot Hi^H \qquad \text{Equation 7}$$

Once the correlation matrix is computed, the correlation metric is computed from the elements of the correlation matrix. Note that the non-diagonal elements of the correlation matrix represent the correlation (transmit and the receiver) values between the antennas. For example, for 2×2 MIMO system assume that the antenna correlation at the transmission side is equal to that of 0.3 and at the receiver side it is equal to 0.0, Then the ideal correlation matrix is of the form $$R_H = \begin{bmatrix} 1 & 0.0 & 0.3 & 0.0 \\ 0.0 & 1.0 & 0.0 & 0.3 \\ 0.3 & 0.0 & 1.0 & 0.0 \\ 0.0 & 0.3 & 0.0 & 1.0 \end{bmatrix}$$

In these cases, the correlation metric can be taken as 0.3. However, in general, when estimating the correlation matrix, the matrices of the following form are often encountered where the elements are not symmetrical. For example, let's say the estimated correlated matrix is of the form $$R_H = \begin{bmatrix} 0.9963 & 0.0031 & 0.299 & 0.0001 \\ 0.0031 & 1.024 & 0.0002 & 0.3015 \\ 0.2999 & 0.0002 & 1.0010 & 0.0004 \\ 0.0001 & 0.3015 & 0.0004 & 0.998 \end{bmatrix}$$

Then the correlation metric can be computed as $$C_m = \frac{\text{mean}(nondiag(R_H))}{\text{mean}(diag(R_H))} \qquad \text{Equation 8}$$

Where mean (X) is the average of the elements of x. In another embodiment, only the maximum value of the non-diagonal element can be taken in the effective correlation metric computation. e.g.:

$$C_m = \frac{\max(nondiag(R_H))}{\text{mean}(\text{diag}(R_H))} \quad \text{Equation 9}$$

In another embodiment, only the minimum value of the non-diagonal element is used in effective correlation metric computation:

$$C_m = \frac{\min(nondiag(R_H))}{\text{mean}(\text{diag}(R_H))} \quad \text{Equation 10}$$

Note that in embodiments, the correlation metric is normalized by the mean of diagonal element.

Figure 6:
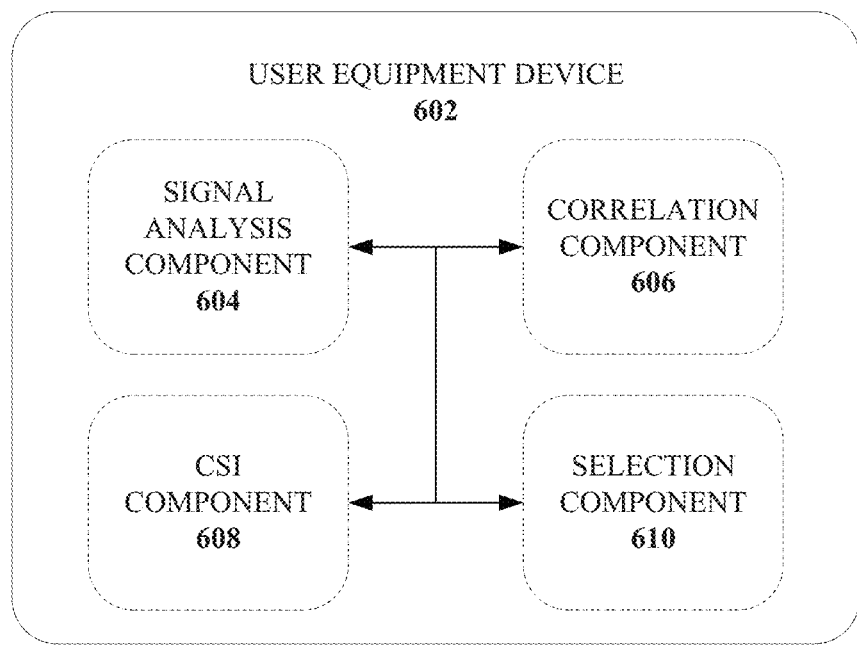
FIG. 6 illustrates an example block diagram of a user equipment device in accordance with various aspects and embodiments of the subject disclosure.

Turning now to FIG. 6, illustrated is an example block diagram 600 of a user equipment device 602 in accordance with various aspects and embodiments of the subject disclosure.

The UE device 602 can include a signal analysis component 604 that can measure the SNR, SINR, and other parameters of a reference signal received from the base station device. In an embodiment, the signal analysis component can also determine a location of the UE device 602, and the location relative to the transmitter node.

The correlation component 606 can also determine a correlation metric according to the one or more embodiments described above with regard to FIG. 5.

The selection component 610 can determine which selection process to use, single stage or dual stage, based on the results of the signal analysis, path loss, correlation and/or location. Once selected, the CSI component 608 can select the beam and determine channel state information according to the selected beam selection process.

It is also to be appreciated that in an embodiment, similar components can be included at the network node/base station device, which can determine which selection process is preferred, based at least in part on the signal to noise ratio, location of the UE, type of UE device, and other factors. The network node can then send an indication of the required beam selection process, or preferred beam selection process to the UE device.

Figure 7:
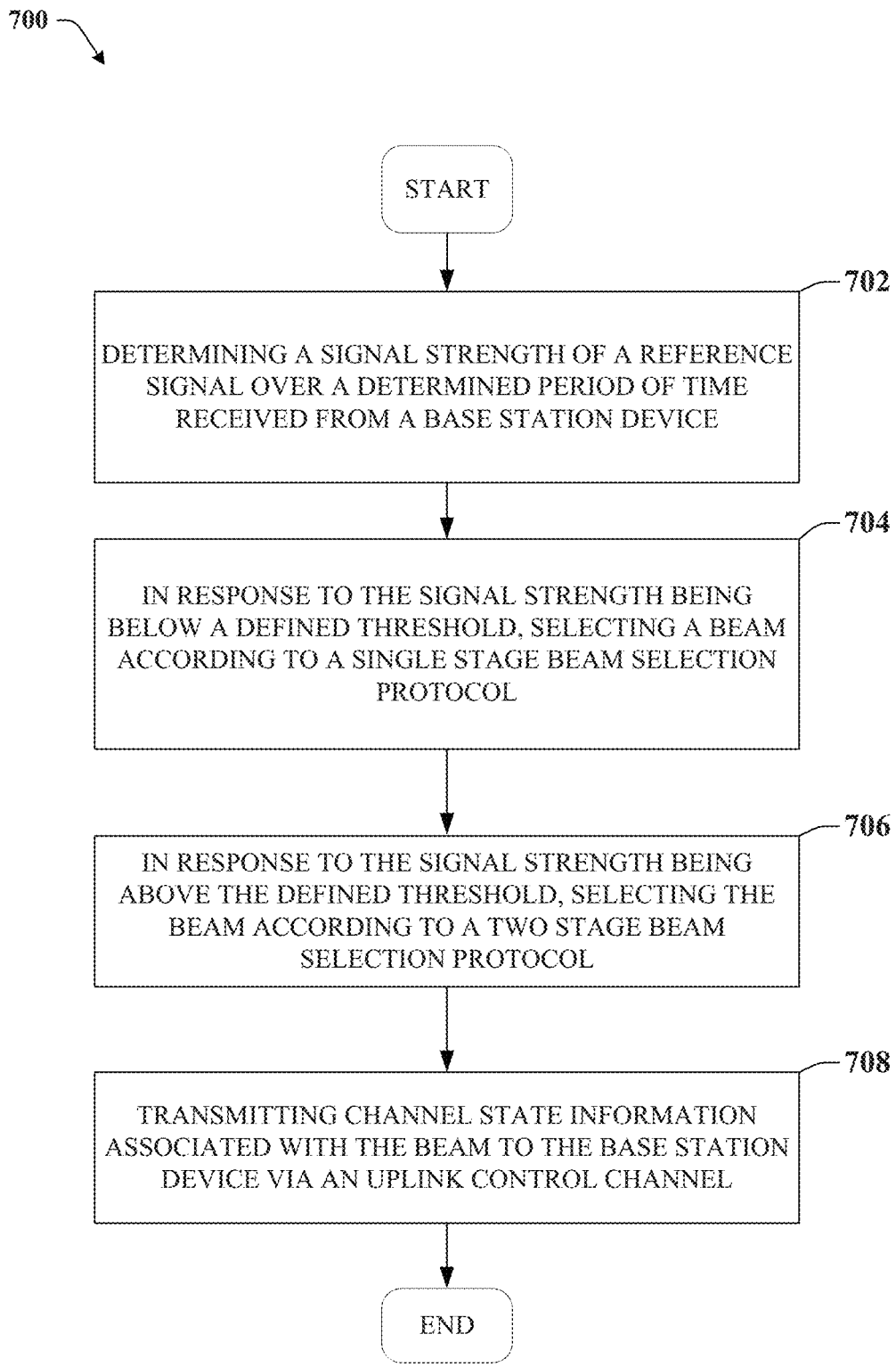
FIG. 7 illustrates an example method for beam selection in accordance with various aspects and embodiments of the subject disclosure.
Figure 8:
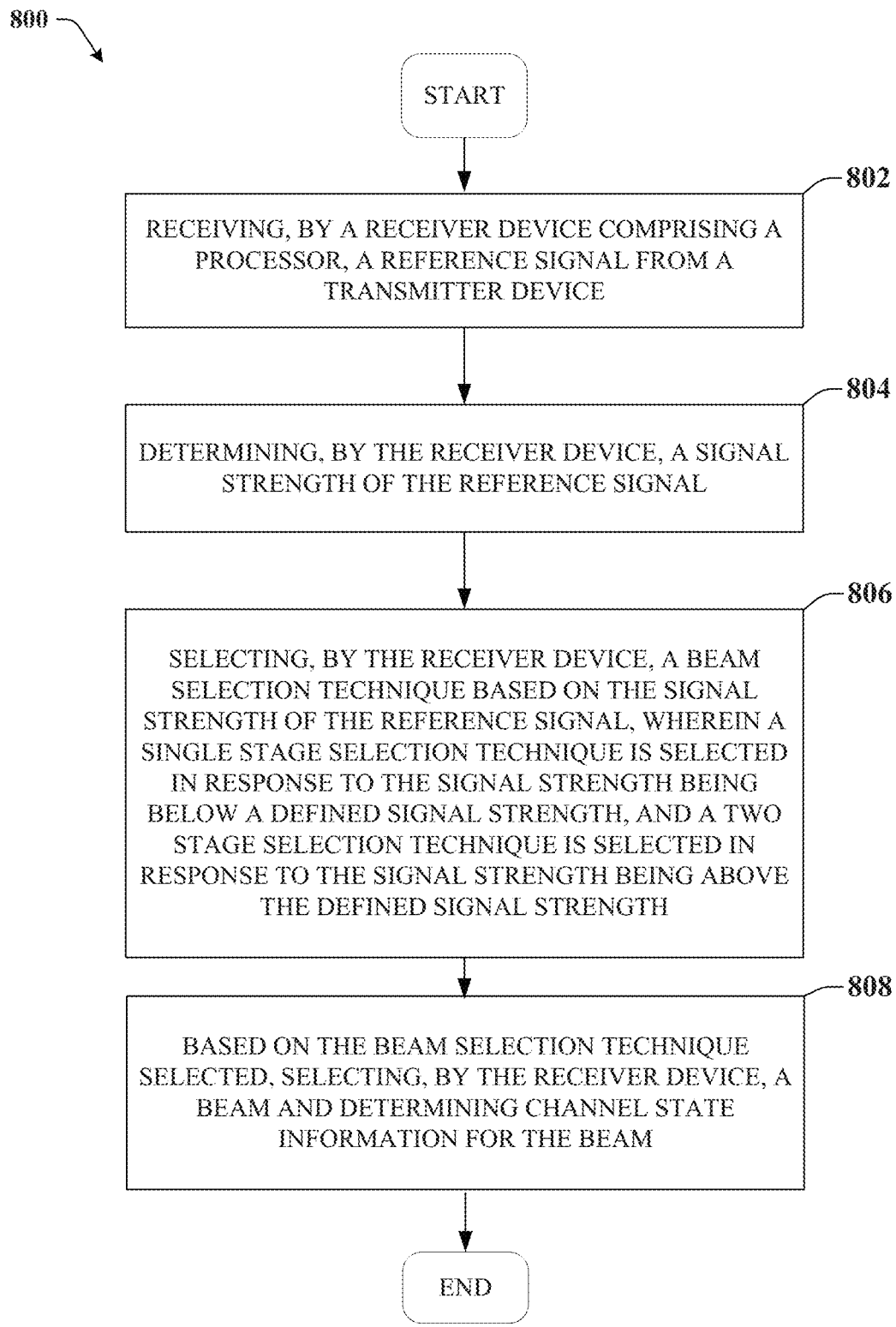
FIG. 8 illustrates an example method for beam selection in accordance with various aspects and embodiments of the subject disclosure.

FIGS. 7-8 illustrates a process in connection with the aforementioned systems. The processes in FIGS. 7-8 can be implemented for example by the systems in FIGS. 1-6 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 7 illustrates an example method 700 for beam selection in accordance with various aspects and embodiments of the subject disclosure.

Method 700 can begin at 702 where the method includes determining a signal strength of a reference signal over a determined period of time received from a base station device.

At 704, the method includes in response to the signal strength being below a defined threshold, selecting a beam according to a single stage beam selection protocol.

At 706, the method includes in response to the signal strength being above the defined threshold, selecting the beam according to a two stage beam selection protocol.

At 708, the method includes transmitting channel state information associated with the beam to the base station device via an uplink control channel FIG. 8 illustrates an example method 800 for beam selection in accordance with various aspects and embodiments of the subject disclosure.

Method 800 can begin at 802 wherein the method includes receiving, by a receiver device comprising a processor, a reference signal from a transmitter device.

At 804, the method can include determining, by the receiver device, a signal strength of the reference signal.

At 806, the method can include selecting, by the receiver device, a beam selection technique based on the signal strength of the reference signal, wherein a single stage selection technique is selected in response to the signal strength being below a defined signal strength, and a two stage selection technique is selected in response to the signal strength being above the defined signal strength.

At 808, the method can include based on the beam selection technique selected, selecting, by the receiver device, a beam and determining channel state information for the beam.

Figure 9:
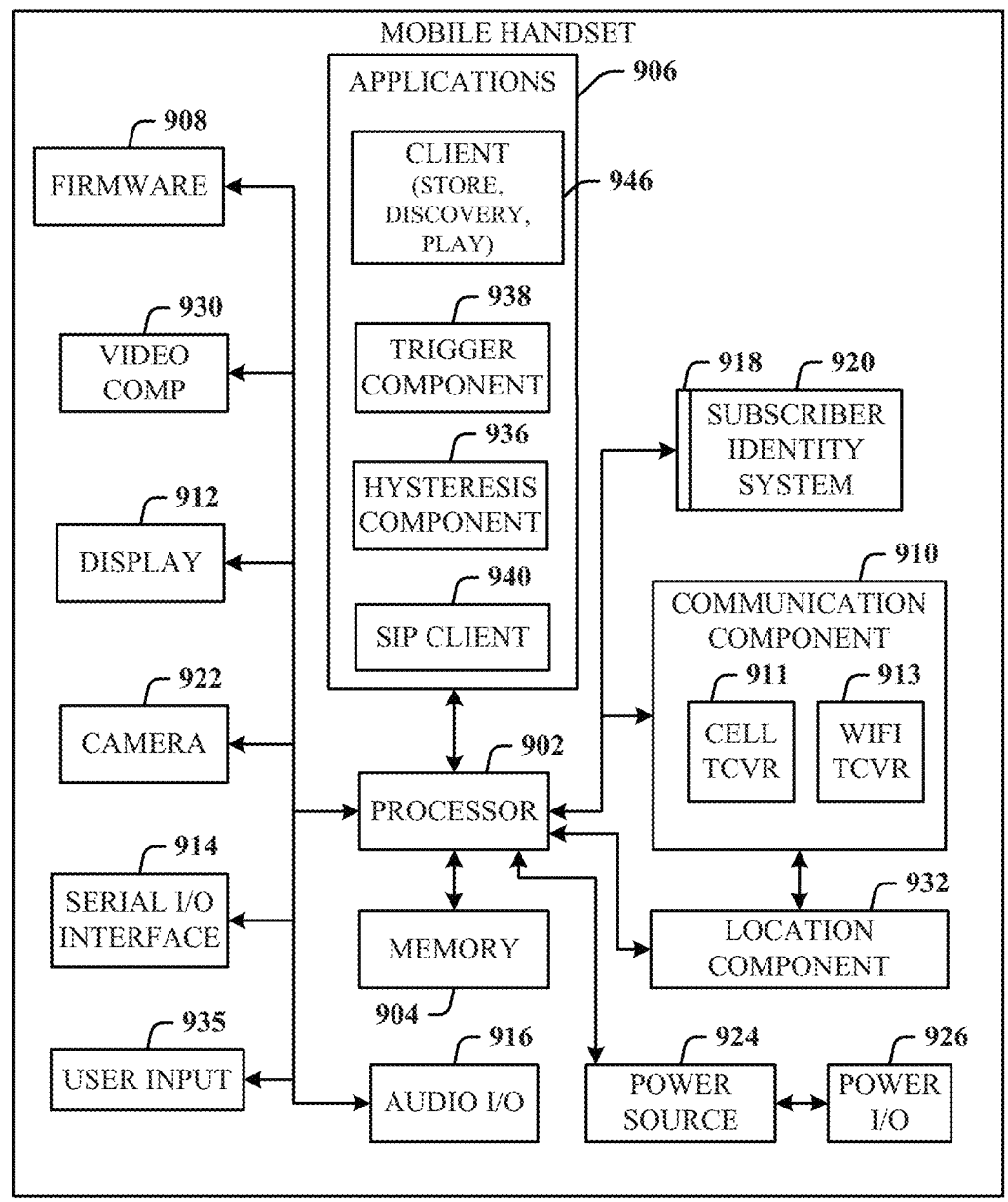
FIG. 9 illustrates an example block diagram of an example user equipment that can be a mobile handset operable to provide a format indicator in accordance with various aspects and embodiments of the subject disclosure.

Referring now to FIG. 9, illustrated is a schematic block diagram of an example end-user device such as a user equipment) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
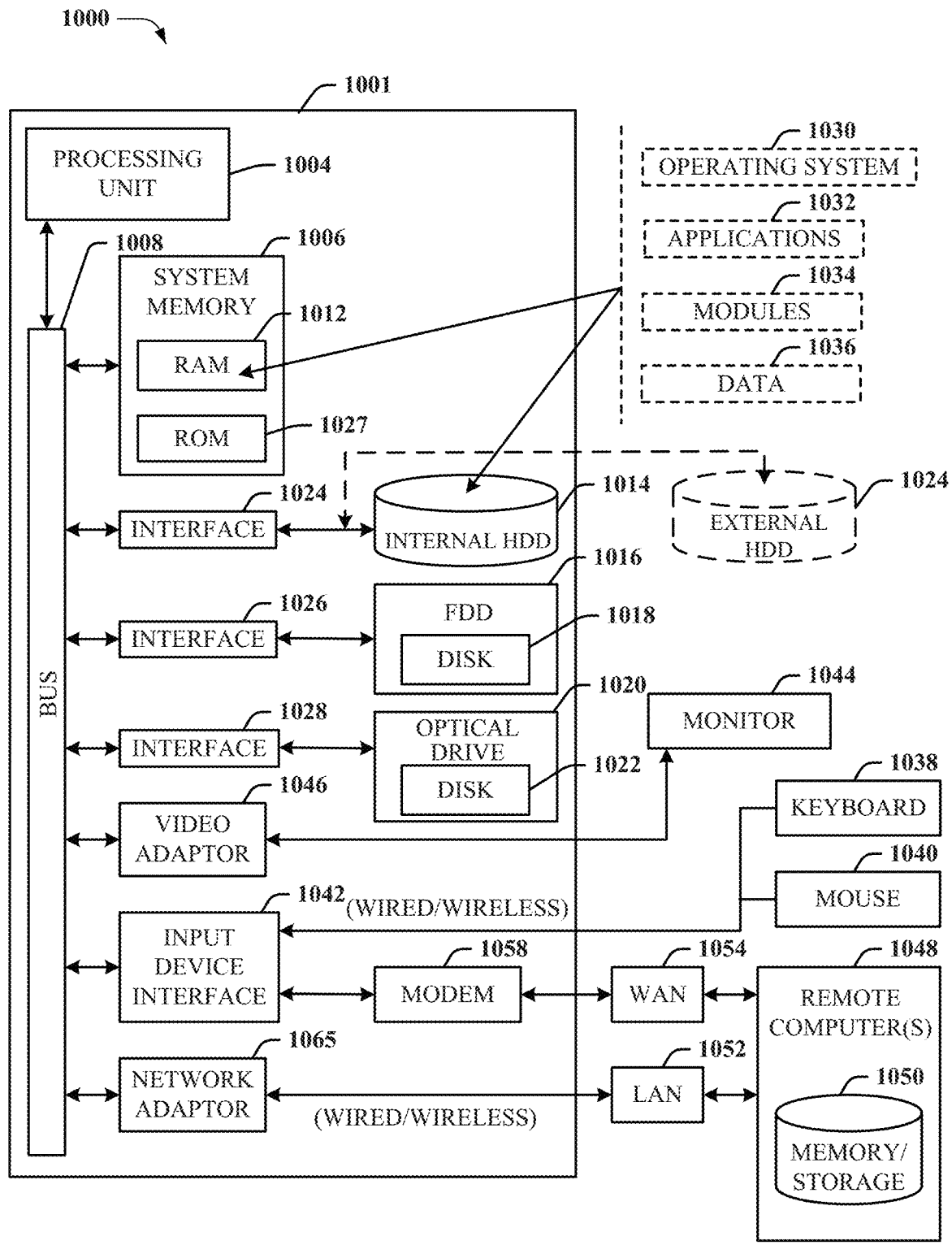
FIG. 10 illustrates an example block diagram of a computer that can be operable to execute processes and methods in accordance with various aspects and embodiments of the subject disclosure.

Referring now to FIG. 10, there is illustrated a block diagram of a computer 1000 operable to execute the functions and operations performed in the described example embodiments. For example, a network node (e.g., network node 106) may contain components as described in FIG. 10. The computer 1000 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the various embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A user equipment device, comprising:
a processor; and
a memory that stores executable instructions that, when executed by the processor, facilitate performance of operations, comprising:
determining a signal strength of a reference signal over a determined period of time received from a base station device;
determining a correlation value associated with the user equipment device and the base station device;
determining whether to select a beam for a transmission from the base station device to the user equipment device according to a single state beam selection protocol or a two stage beam selection protocol, comprising:
in response to the signal strength being below a defined threshold, and the correlation value being below a correlation value threshold, selecting the beam according to the two stage beam selection protocol, and
in response to the signal strength being above the defined threshold, and the correlation value being above the correlation value threshold, selecting the beam according to the single stage beam selection protocol, and
transmitting channel state information associated with the beam to the base station device via an uplink control channel.

2. The user equipment device of claim 1, wherein the determining the signal strength of the reference signal further comprises:
determining a location of the user equipment device relative to the base station device.

3. The user equipment device of claim 1, wherein the determining the signal strength of the reference signal further comprises:
determining a path loss of the reference signal.

4. The user equipment device of claim 1, wherein the correlation value is based on multiple channels.

5. The user equipment device of claim 1, wherein the selecting the beam according to the single stage beam selection protocol comprises selecting the beam based on identifying the beam and associated channel state information that corresponds to a highest throughput of a group of beams.

6. The user equipment device of claim 1, wherein the selecting the beam according to the two stage beam selection protocol comprises selecting the beam of a group of beams that has a highest signal power, and wherein the operations further comprise, after the selecting the beam, determining the channel state information for the beam.

7. The user equipment device of claim 6, wherein a throughput of the beam with the channel state information has a block error ratio below a block error ratio threshold.

8. The user equipment device of claim 1, wherein the operations further comprise:
selecting the two stage beam selection protocol or the single stage beam selection protocol further based on network control information received from the base station device.

9. A method, comprising:
receiving, by a receiver device comprising a processor, a reference signal from a transmitter device;
determining, by the receiver device, a signal strength of the reference signal;
determining, by the receiver device, a correlation value associated with the receiver device and the transmitter device;
determining, by the receiver device, whether to select a beam for a transmission from the transmitter device to the receiver device according to a single state beam selection technique or a two stage beam selection technique, comprising:
in response to the signal strength being below a defined threshold, and the correlation value being below a correlation value threshold, selecting the beam according to the two stage beam selection technique, and
in response to the signal strength not being below the defined threshold, and the correlation value being above the correlation value threshold, selecting the beam according to the single stage beam selection technique; and determining, by the receiver device, channel state information for the beam.

10. The method of claim 9, wherein the determining the signal strength of the reference signal further comprises:
determining a location of the receiver device relative to the transmitter device.

11. The method of claim 9, wherein the determining the signal strength of the reference signal further comprises:
determining a path loss of the reference signal.

12. The method of claim 9, further comprising selecting, by the receiver device, the two stage beam selection technique or the single stage beam selection technique further based at least in part on network control information received from the transmitter device.

13. The method of claim 9, wherein the selecting the beam according to the single stage beam selection protocol comprises selecting the beam based on identifying the beam and associated channel state information that corresponds to a highest throughput of a group of beams.

14. The method of claim 9, wherein the selecting the beam according to the two stage beam selection protocol comprises selecting the beam of a group of beams that has a highest signal power, and further comprising, after the selecting the beam,
determining the channel state information for the beam.

15. The method of claim 14, wherein a throughput of the beam with the channel state information has a block error ratio below a block error ratio threshold.

16. A machine-readable storage medium, comprising executable instructions that, when executed by a processor of a network device, facilitate performance of operations, comprising:
receiving an indication from a user equipment device about a signal strength of a reference signal received by the user equipment device from the network device;
determining a correlation value associated with the user equipment device and the network device;
determining whether to select a beam for a transmission from the network device to the user equipment device according to a single state beam selection protocol or a two stage beam selection protocol, comprising:
in response to the signal strength not being above a defined threshold, selecting the beam according to the two stage beam selection protocol, and the correlation value being below a correlation value threshold, and
in response to the signal strength being above the defined threshold, and the correlation value being above the correlation value threshold, selecting the beam according to the single stage beam selection protocol; and
transmitting an indication of a selected beam selection protocol to the user equipment device.

17. The machine-readable storage medium of claim 16, wherein the selecting the beam according to the single stage beam selection protocol comprises selecting the beam based on identifying the beam and associated channel state information that corresponds to a highest throughput of a group of beams.

18. The machine-readable storage medium of claim 16, wherein the selecting the beam according to the two stage beam selection protocol comprises selecting a beam of a group of beams that has a highest signal power, and, after the selecting, determining the channel state information for the beam.

19. The machine-readable storage medium of claim 16, wherein the operations further comprise:
determining a location of the user equipment device relative to the base station device.

20. The machine-readable storage medium of claim 16, wherein the operations further comprise:
determining a path loss of the reference signal.

* * * * *